(12) United States Patent
Danilak

(10) Patent No.: US 7,619,629 B1
(45) Date of Patent: Nov. 17, 2009

(54) METHOD AND SYSTEM FOR UTILIZING MEMORY INTERFACE BANDWIDTH TO CONNECT MULTIPLE GRAPHICS PROCESSING UNITS

(75) Inventor: Radoslav Danilak, Cupertino, CA (US)

(73) Assignee: NVIDIA Corporation, Santa Clara, CA (US)

(*) Notice: Subject to any disclaimer, the term of this patent is extended or adjusted under 35 U.S.C. 154(b) by 562 days.

(21) Appl. No.: 11/455,079

(22) Filed: Jun. 15, 2006

(51) Int. Cl.
*G06F 15/16* (2006.01)
*G06F 15/80* (2006.01)

(52) U.S. Cl. .................. 345/502; 345/503; 345/504; 345/505

(58) Field of Classification Search ......... 345/502–505, 345/520, 543, 552, 611, 535, 536
See application file for complete search history.

(56) References Cited

U.S. PATENT DOCUMENTS 6,359,624 B1 * 3/2002 Kunimatsu .................. 345/503
6,940,512 B2 * 9/2005 Yamaguchi et al. ......... 345/505

* cited by examiner

*Primary Examiner*—Hau H Nguyen
(74) *Attorney, Agent, or Firm*—Patterson & Sheridan, LLP

(57) ABSTRACT

A methods and system for utilizing memory interface bandwidth to connect multiple graphics processing units are disclosed. According to one embodiment of the present invention, a first graphics processing unit is configured to allocate a portion of an initial memory interface supported by both the first graphics processing unit and a first video memory for a private connection. This private connection enables this first graphics processing unit to directly communicate with a second graphics processing unit and also access resources of the second graphics processing unit.

21 Claims, 4 Drawing Sheets

METHOD AND SYSTEM FOR UTILIZING MEMORY INTERFACE BANDWIDTH TO CONNECT MULTIPLE GRAPHICS PROCESSING UNITS

BACKGROUND OF THE INVENTION

1. Field of the Invention

Embodiments of the present invention relate generally to video processing and more specifically to utilizing memory interface bandwidth to connect multiple graphics processing units.

2. Description of the Related Art

Unless otherwise indicated herein, the approaches described in this section are not prior art to the claims in this application and are not admitted to be prior art by inclusion in this section.

To meet the ever increasing demands for realism, quality, and real-time interactivity of displayed images and videos in graphics applications, one solution is to use multiple graphics processing units ("GPUs") in a graphics system. FIG. 1 is a simplified block diagram of a graphics system, 100, that includes two graphics adapters, 102 and 112, each of which contains a GPU. Graphics adapter 102 includes GPU 104 and video memory 106, which further includes at least frame buffer 108 and texture memory 110. Frame buffer 108 contains data that are to be transmitted to the display device of graphics system 100, or otherwise referred to as "scanning out," and texture memory 110 contains not only the texture map information but also texture render targets, each of which stores intermediate values to be contributed to the final image in the frame buffer. Similarly, graphics adapter 112 also has GPU 114, video memory 116, frame buffer 118, and texture memory 120. These two graphics adapters are connected to chipset 122, which supports Peripheral Component Interface ("PCI") Express ("PCIe"), to access the system resources of graphics system 100.

Using the scalable link interface ("SLI") technology developed by Nvidia Corporation of Santa Clara, Calif., the two graphics adapters in graphics system 100 typically take on processing tasks in a master and slave arrangement to produce a single output. In one implementation using the SLI technology, GPU 104 is further coupled to GPU 112 via video bridge 124. In a typical setup, video bridge 124 operates at up to 10 Gigabytes ("GB") per second. The interfaces between the GPUs and the video memory modules, such as memory interfaces 126 and 128, operate at up to 100 Gigabytes ("GB") per second. Graphics adapters 102 and 112 are PCIe-compliant devices that typically support 16 lanes, otherwise referred to as x16 graphics adapters. Each lane supports data rate of 500 Megabytes ("MB") per second. Each of PCIe links 130 and 132 typically supports 8 lanes and thus operates at up to 4 GB per second. The significantly slower data rates of video bridge 124 and PCIe links 130 and 132 than memory interfaces 126 and 128 result in bottlenecks in graphics system 100 and reduce the overall throughput of the system.

Certain operations supported by the SLI technology further highlight these performance issues. They are: the split-frame rendering ("SFR"), the alternative-frame rendering ("AFR"), and the SLI anti-aliasing operations. Suppose GPU 104 is the master GPU in graphics system 100, and GPU 114 is the slave GPU. In the SFR mode, GPU 104 is responsible for the top section of the screen, and GPU 114 is responsible for the bottom section. Although each GPU in an SLI configuration generally maintains its own copy of all local resources without having to share with the other GPU, any change to a texture render target needs to be broadcasted to all other GPUs. The performance penalty related to this broadcast is further exacerbated by the discrepancy between the data rates of memory interfaces 126 and 128 (i.e., at approximately 100 GB/s) and whichever data transfer path (i.e., one path via video bridge 124 at approximately 10 GB/s or another path via chipset 122 at approximately 4 GB/s) the GPUs select for the broadcast.

In the AFR mode, GPU 104 works on the odd frames, and GPU 114 independently works on the even frames. Because of this alternating mechanism, the GPU responsible for a frame that is not self-contained pushes the necessary data to the other GPU to operate on the next frame. A self-contained frame is a frame that shares little to no data among the multiple GPUs in the AFR mode. In other words, if frame 1 incorporates certain texture render targets that are needed in the subsequent frame (in other words, frame 1 is not self-contained), then GPU 104 pushes the texture data to GPU 114 to operate on frame 2. Similar to the discussions above, the transferring of such texture data, especially via the relatively inefficient data transfer path, introduces overhead and reduces the throughput of graphics system 100.

In the SLI anti-aliasing mode, each GPU renders the same frame, except the two frames are offset by half of a pixel. Before GPU 104 scans out data from its frame buffer 108, GPU 114 pushes the results of its anti-aliasing operation from its frame buffer 118 to a temporary buffer in a direct memory access ("DMA") copy operation. GPU 104 then needs to pull the data from the temporary buffer and combines the data with the content of its frame buffer 108. These two operations are commonly referred to as a "pull and blend" operation. In one implementation, the temporary buffer resides in video memory 106, otherwise denoted as temporary buffer 134 in FIG. 1. The push operation of GPU 114 to transfer data to temporary buffer 134 and the subsequent pull and blend operation involving the transferred data in temporary buffer 134 all involve the inefficient data transfer path as discussed above.

Furthermore, because graphics system 100 includes two identical graphics adapters, graphics system 100 is at least twice as costly as a single graphics adapter. However, a graphics application that runs on graphics system 100 only recognizes a graphics adapter and thus only one set of resources. In other words, suppose each of video memories 106 and 116 is of the size of 256 MB. The graphics application still only recognizes and utilizes 256 MB of video memory as opposed to 512 MB. The content of one video memory is duplicated across all the graphics adapters, especially the texture rendering targets, so that the GPUs can carry out the texturing operations locally. In short, the additional resources in a multi-GPU system like graphics system 100 are not fully utilized.

In addition, unless the load balancing between the two GPUs is done flawlessly, the GPUs are unlikely to complete their given tasks at the same time at all times. Also, the GPUs need to be synchronized so that the proper frame is displayed at the appropriate time. As has been shown, the inadequate utilization of the additional resources as discussed above and the overhead of performing load balancing, synchronization, and data exchanges via inefficient data transfer paths between the graphics adapters all contribute to reducing the overall throughput of graphics system 100 to be less than twice that of a single graphics adapter.

As the foregoing illustrates, what is needed is a way to further increase the overall throughput but reduce the cost for a multi-GPU system.

SUMMARY OF THE INVENTION

A method and system for utilizing memory interface bandwidth to connect multiple graphics processing units are disclosed. According to one embodiment of the present invention, a first graphics processing unit is configured to allocate a portion of an initial memory interface supported by both the first graphics processing unit and a first video memory for a private connection. This private connection enables this first graphics processing unit to directly communicate with a second graphics processing unit and also access resources of the second graphics processing unit.

One advantage of the disclosed method and system is that they provide a cost effective architecture, which has desirable performance per dollar and scalability characteristics over the prior art approaches.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

A methods and system for utilizing memory interface bandwidth to connect multiple graphics processing units are described. In the following description, for the purposes of explanation, numerous specific details are set forth in order to provide a thorough understanding of the present invention. It will be apparent, however, to one skilled in the art that the present invention may be practiced without these specific details.

Figure 2:
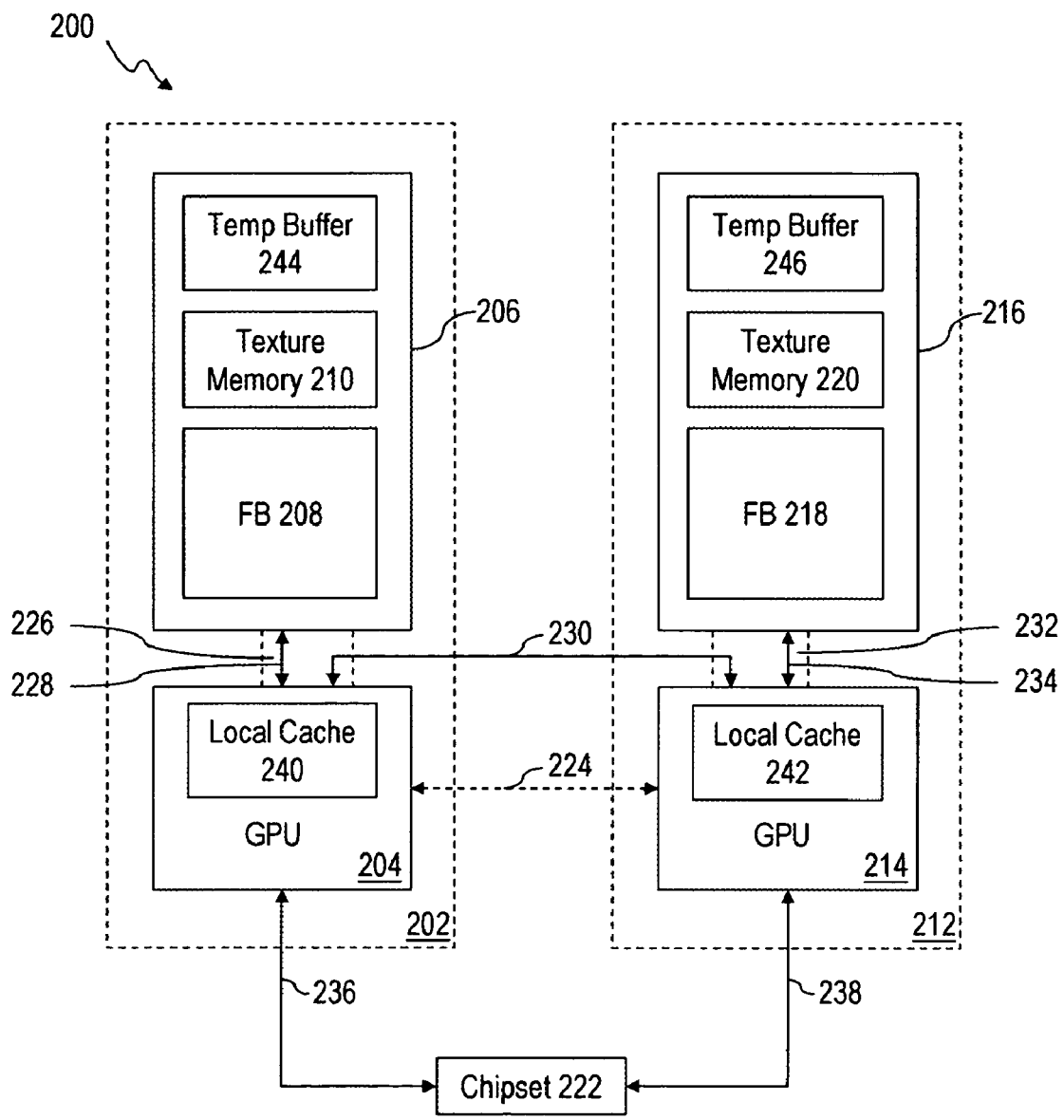
FIG. 2 is a simplified block diagram of a graphics system that includes two graphics adapters, each of which contains a GPU, according to one embodiment of the present invention.

FIG. 2 is a simplified block diagram of a graphics system, 200, that includes two graphics adapters, 202 and 212, each of which contains a GPU, according to one embodiment of the present invention. In addition to the data transfer paths via chipset 222 and optionally via video bridge 224, graphics system 200 includes another data transfer path, private connection 230, which provides a direct connection between the two graphics adapters. Portions of the bandwidth of initial memory interfaces 226 and 232 are allocated to support private connection 230. Each of initial memory interfaces 226 and 232 here refers to the full memory interface supported by the physical GPU device and the video memory device and typically operates at a data rate up to 100 GB per second. The remaining portion of initial memory interface 226, such as reduced memory interface 228, still serves as the memory interface between GPU 204 and video memory 206. Likewise, the remaining portion of initial memory interface 232, such as reduced memory interface 234, also serves as the memory interface between GPU 214 and video memory 216. In one implementation, private connection 230 operates at half of the data rate of an initial memory interface, up to 50 GB per second, and each of reduced memory interfaces 228 and 234 also operates at a data rate up to 50 GB per second. It should however be apparent to one with ordinary skill in the art to allocate the bandwidths of initial memory interfaces 226 and 232 in any technically feasible proportionality among private connection 230 and reduced memory interfaces 228 and 234 without exceeding the scope of the claimed invention. For instance, private connection 230 may operate at 25 GB per second, and each of reduced memory interfaces 228 and 234 may operate at 75 GB per second.

Suppose each of reduced memory interfaces 228 and 234 operates at half of the data rate of each of initial memory interfaces 226 and 232, respectively. Each of GPU 204 and GPU 214 further includes local caches 240 and 242, respectively, to compensate for the halving of the bandwidths for the GPUs to access their local video memory modules. In one implementation, the size of each of these local caches is at least 4 MB. Because private connection 230 supports a significantly higher data rate than video bridge 224 (i.e., up to 10 GB per second) and PCIe links 236 and 238 (i.e., up to 4 GB per second for each link), it enables a local GPU, such as GPU 204, to access the resources in a remote graphics adapter, such as graphics adapter 212, and synchronize its operations with a remote GPU, such as GPU 214, efficiently. As a result, GPU 204 and GPU 214 behave as a single logical GPU from the perspective of the graphics application; the two 4 MB local caches, 240 and 242, behave as a single logical 8 MB local cache; and video memories 206 and 216 behave as a single logical video memory of the size of the combined video memories 206 and 216.

The aforementioned logical construct removes the distinct separation between local and remote resources and thus eliminates the need for GPU 204 to maintain a copy of the resources of graphics adapter 212 in its local video memory 206. Therefore, the size of each of video memory 206 and video memory 216 is reduced to half of the size of each of video memory 106 and video memory 116 of FIG. 1, respectively. More particularly, texture memory 210 and texture memory 220 no longer contain the same texture information and texture rendering targets, and their sizes are reduced in half. In one implementation, texture memory 210 contains the texture data for the frame that GPU 204 is responsible for, and texture memory 220 contains the texture data for the frame that GPU 214 is responsible for. If GPU 204 needs a particular texture rendering target in texture memory 220 for its rendering operation, then GPU 204 directly retrieves the texture rendering target from texture memory 220 via private connection 230 as opposed to copying the texture rendering target to its local texture memory 210 before rendering. Similarly, for an anti-aliasing operation, instead of being limited to pulling and blending data from its local temporary buffer 244, GPU 204 could pull and blend data from temporary buffer 246 via private connection 230. That way, the size of temporary buffer 244 is also reduced, because it only needs to store the results of the anti-aliasing operation performed by GPU 204 but not the results from GPU 214.

According to the results of some simulations, an 8 MB logical local cache has a hit rate of approximately 55% regarding rendering data from the single logical video memory. In other words, approximately 55% of the traffic received by the logical GPU from the single logical video memory can be cached. Therefore, the logical GPU only needs to request for the other 45% of the data from the logical video memory in its rendering operations. For comparison purposes, some simulation results also show that a hit rate of approximately 30% is achieved for a single graphics adapter solution utilizing a single 4 MB local cache. In other words, the memory interface bandwidth between the logical GPU and the logical video memory is expected to be approximately 155% of the bandwidth of the memory interface in the single graphics adapter solution. In addition to measuring performance in terms of bandwidth, simulations have been conducted to show that the application performance of graphics system 200 is approximately 135% of the application performance of a single GPU solution.

Figure 1:
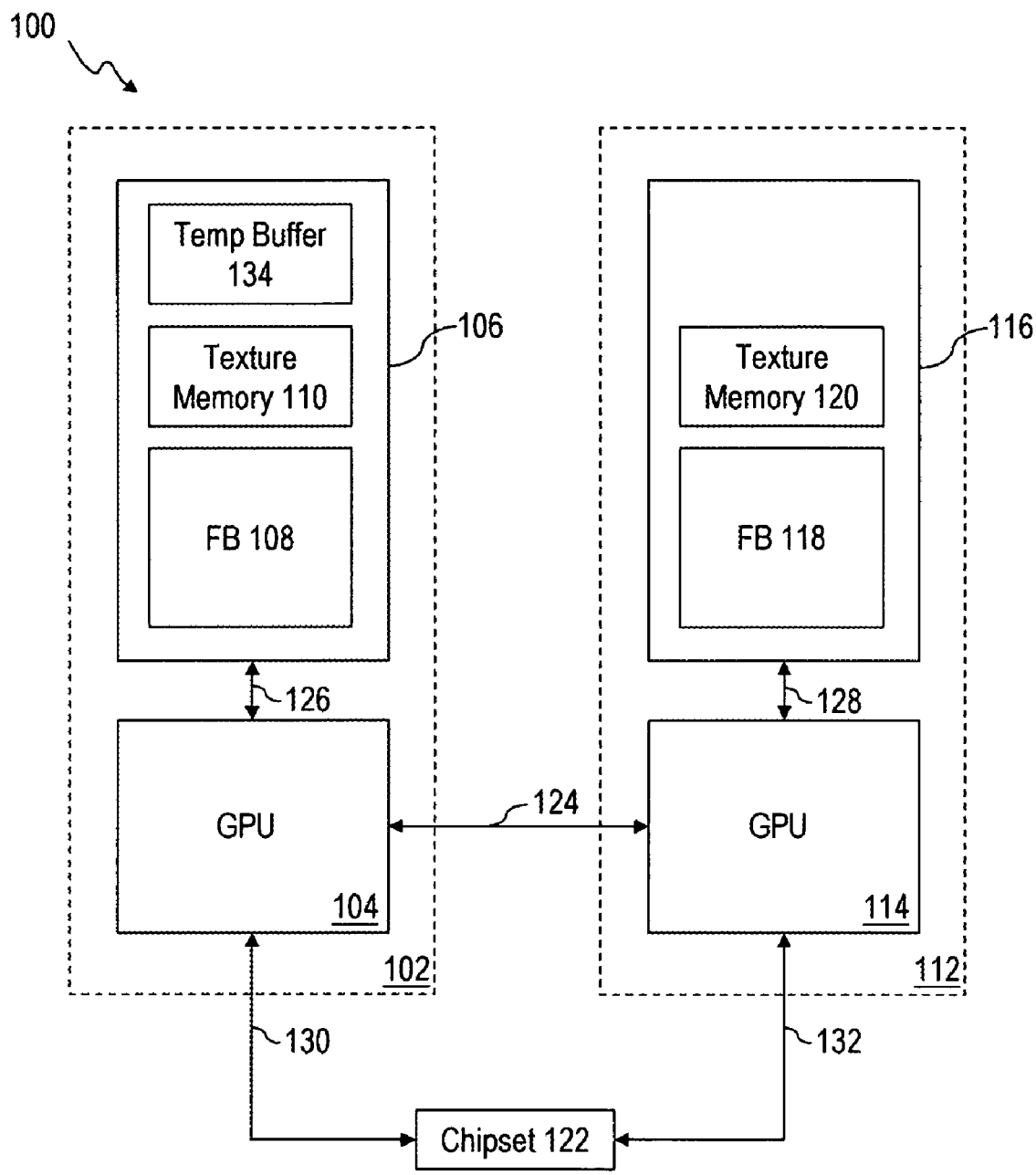
FIG. 1 is a simplified block diagram of a prior art graphics system that includes two graphics adapters, each of which contains a GPU.

One way to measure the cost increase from a single graphics adapter solution, such as graphics adapter 102 of FIG. 1, to a two-graphics-adapter system, such as graphics system 200, is to compare the aggregate cost of the significant components in the two solutions, namely, the aggregated cost of GPU and the video memory. Suppose the cost for the GPU and the video memory is the same and is assigned the value of 1. Suppose further than graphics system 200 and graphics adapter 102 uses the same GPU and video memory parts. Using this convention, the cost of graphics adapter 102 is two, because it has a single GPU and a single video memory. As for graphics system 200, the cost is three, because it has two GPUs, 204 and 214, and one video memory. The one video memory here refers to the combined video memory 206 and video memory 216, the size of which is the same as video memory 106 of FIG. 1 as discussed above. In other words, the cost increase from a single graphics adapter solution to a two-graphics-adapter solution can be determined by (3−2)/2, which yields 50%. So, the cost of graphics system 200 is 150% of the cost of graphics adapter 102.

To quantify the relationship between the cost to realize certain performance gain and the actual performance gain, one approach is use the "performance cost" or "performance per dollar" ratio by dividing performance gain by cost increase. Thus, using some of the numbers shown above, in terms of application performance, the performance cost ratio for graphics system 200 is 135%/150%, which yields 90%. This indicates that 90% of the additional dollars spent in developing graphics system 200 results in the application performance gain over the single graphics adapter 102. In terms of the performance based on bandwidth, the performance cost ratio for graphics system 200 is 155%/150%, which yields 103%. This indicates that every additional dollar spent in developing graphics system 200 results in the performance gain over the single graphics adapter 102.

Figure 3:
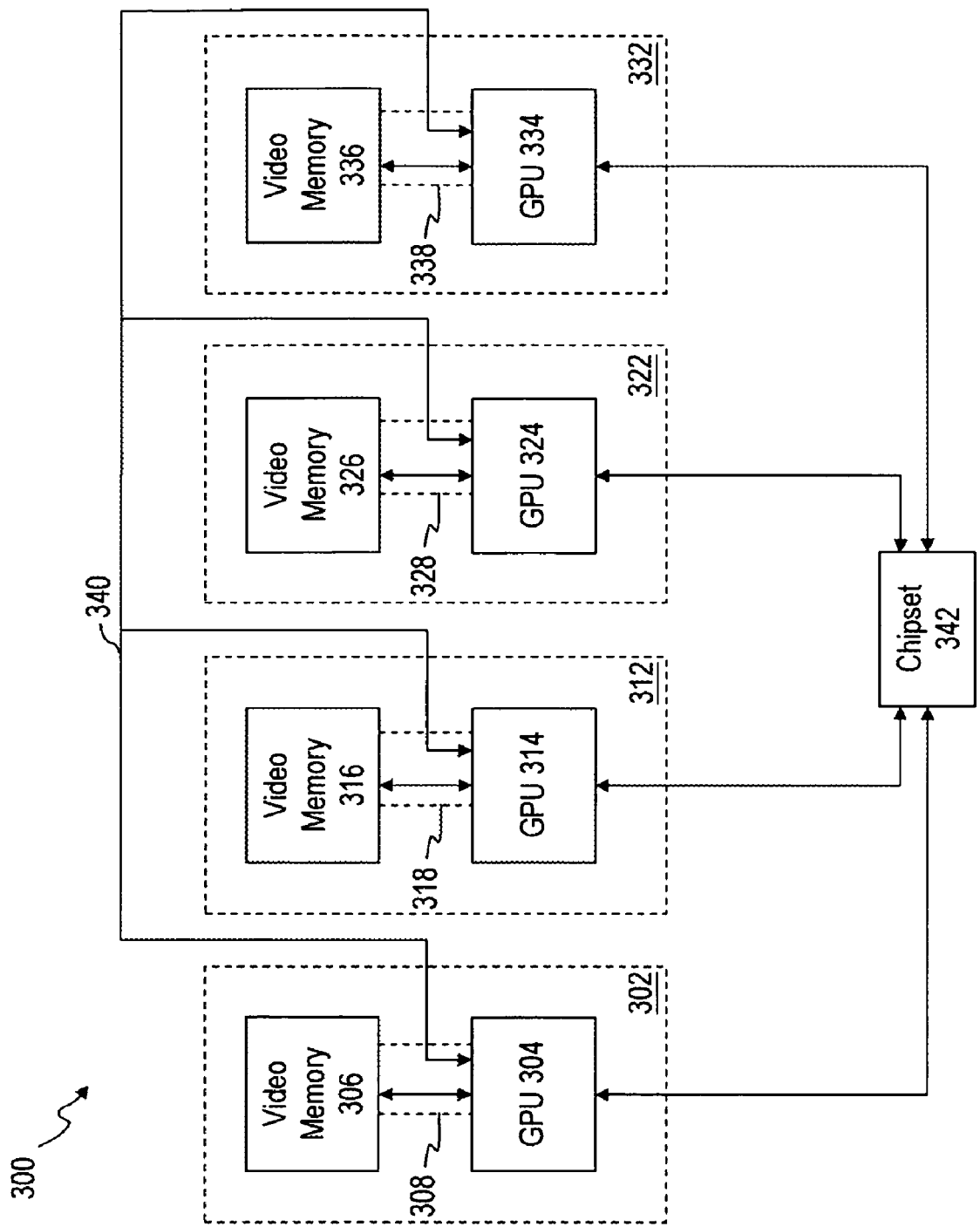
FIG. 3 is a simplified block diagram of a multi-GPU system, according one embodiment of the present invention.

FIG. 3 is a simplified block diagram of a multi-GPU system, according one embodiment of the present invention. Specifically, extending the architecture of utilizing private connection 230 in graphics system 200, graphics system 300 includes four graphics adapters, 302, 312, 322, and 332 that are directly connected to one another via private connection 340. In one embodiment, each of GPU 304 in graphics adapter 302, GPU 314 in graphics adapter 312, GPU 324 in graphics adapter 322, and GPU 334 in graphics adapter 332 allocate 50% of initial memory interfaces 308, 318, 328, and 338, respectively, to private connection 340. With private connection 340, GPU 304, GPU 314, GPU 324, and GPU 334 behave as a single logical GPU, and video memory 306, video memory 316, video memory 326, and video memory 336 behave as a single logical video memory. It should be apparent to one with ordinary skill in the art to scale graphics system 300 further using the private connection architecture and allocate any technically feasible proportionality of the initial memory interfaces to the private connection without exceeding the scope of the claimed invention.

Figure 4:
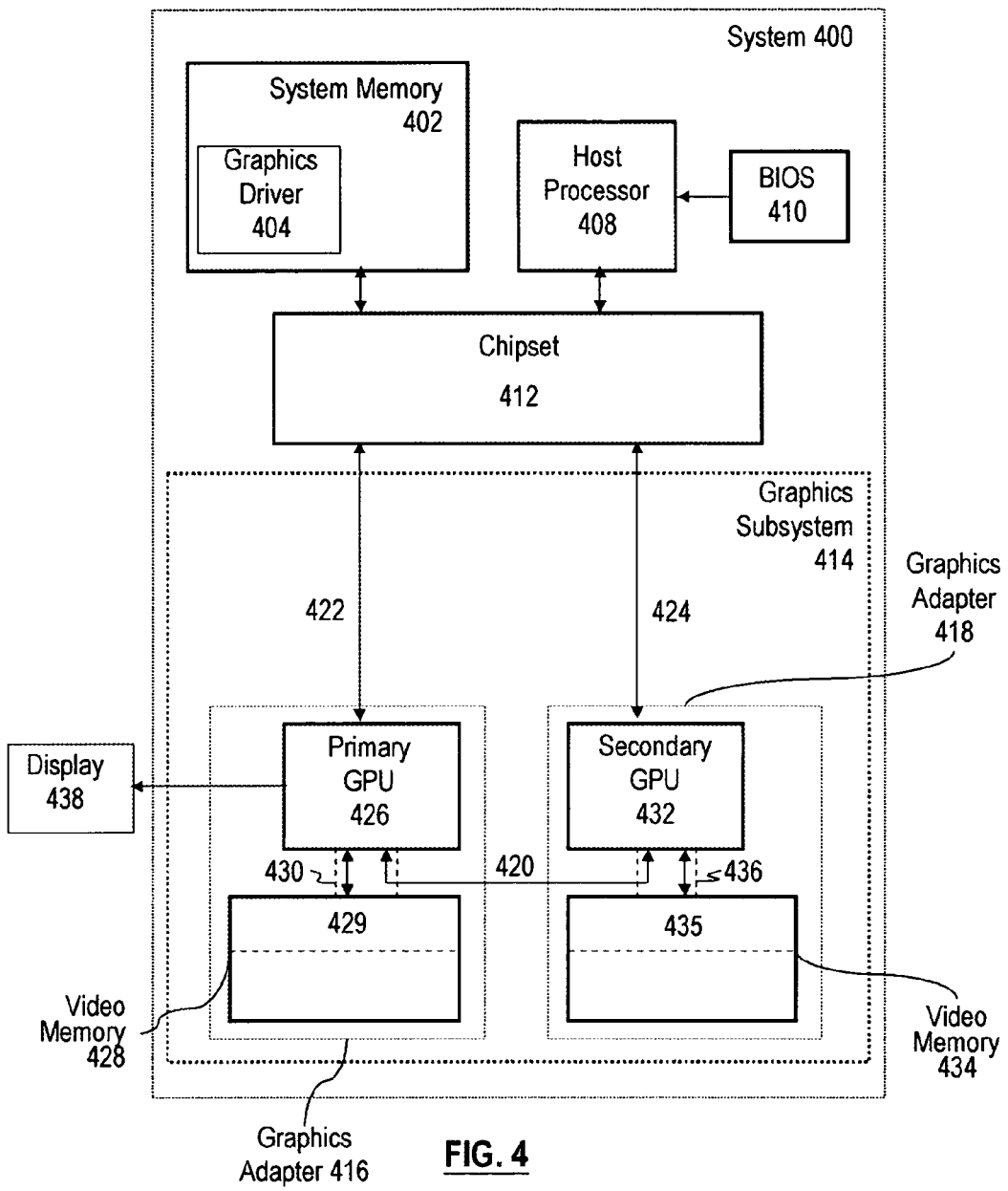
FIG. 4 is a block diagram of a system configured to implement one or more aspects of the present invention.

FIG. 4 is a block diagram of a system configured to implement one or more aspects of the present invention. Without limitation, system 400 may be a desktop computer, server, laptop computer, palm-sized computer, tablet computer, game console, cellular telephone, hand-held device, mobile device, computer based simulator, or the like. System 400 includes host processor 408, BIOS 410, system memory 402, and chipset 412 that is directly coupled to graphics subsystem 414. BIOS 410 is a program stored in read only memory ("ROM") or flash memory that is run at bootup. Graphics subsystem 414 includes graphics adapters 416 and 418, each with a single GPU, namely primary GPU 426 and secondary GPU 432, respectively. Here, graphics adapters 416 and 418 and primary GPU 426 and secondary GPU 432 correspond to graphics adapters 202 and 212 and GPU 204 and GPU 214 of FIG. 2, respectively.

A device driver, graphics driver 404, stored within system memory 402, configures primary GPU 426 and secondary GPU 432 to share the graphics processing workload performed by system 400 and to communicate with applications that are executed by host processor 408. In one embodiment, graphics driver 404 generates and places a stream of commands in a "push buffer," which is then transmitted to the GPUs. When the commands are executed, certain tasks, which are defined by the commands, are carried out by the GPUs.

In some embodiments of system 400, chipset 412 provides interfaces to host processor 408, memory devices, storage devices, graphics devices, input/output ("I/O") devices, media playback devices, network devices, and the like. Some examples of the interfaces include, without limitation, Advanced Technology Attachment ("ATA") bus, Accelerated Graphics Port ("AGP"), Universal Serial Bus ("USB"), Peripheral Component Interface ("PCI"), and PCIe. Chipset 412 corresponds to chipset 222 of FIG. 2. It should be apparent to a person skilled in the art to implement chipset 412 in two or more discrete devices, each of which supporting a distinct set of interfaces. It should also be apparent to a person skilled in the art to recognize that the GPUs may be connected to chipset 412 through a PCIe bridge chip, which may be a part of chipset 412.

Links 422 and 424 support symmetric communication links and corresponds to links 236 and 238 of FIG. 2, respectively. Private connection 420, a direct connection between primary GPU 426 and secondary GPU 432 that utilizes portions of memory interfaces 430 and 436, corresponds to private connection 230 of FIG. 2.

As shown, primary GPU 426 within graphics adapter 416 is responsible for outputting image data to display 438. Display 438 may include one or more display devices, such as, without limitation, a cathode ray tube ("CRT"), liquid crystal display ("LCD"), or the like. Primary GPU 426 is also coupled to video memory 428, which may be used to store image data and program instructions. In one embodiment, primary frame buffer 429, which is a portion of video memory 428 is allocated to store image data. Secondary GPU 432 within graphics adapter 418 is coupled to video memory 434, which may also be used to store image data and program instructions. Similarly, one embodiment of video memory 434 has an allocated portion, secondary frame buffer 435, to store image data.

The above description illustrates various embodiments of the present invention along with examples of how aspects of the present invention may be implemented. Although the graphics subsystems illustrated and discussed above include graphics adapters, each of which contains a single GPU, it should be apparent to a person of ordinary skills in the art to practice the present invention using other graphics subsystems that utilizes graphics adapters, each of which contains multiple GPUs. The above examples, embodiments, and drawings should not be deemed to be the only embodiments, and are presented to illustrate the flexibility and advantages of the present invention as defined by the following claims.

I claim:

1. A multi-graphics processing unit graphics system, comprising:
   a first graphics processing unit supporting a first initial memory interface to communicate with a first video memory that is directly coupled to the first graphics processing unit; and
   a second graphics processing unit supporting a second initial memory interface to communicate with a second video memory that is directly coupled to the second graphics processing unit, wherein
   the first graphics processing unit is directly coupled to the second graphics processing unit via a private connection utilizing a portion of the first initial memory interface and a portion of the second initial memory interface to create a single logical graphics processing unit and a single logical video memory module that appear to a graphics application as a single graphics processing unit coupled to a video memory having a memory capacity equal to the sum of the first video memory capacity and the second video memory capacity.

2. The graphics system of claim 1, wherein
   the first graphics processing unit communicates with the first video memory via a first reduced memory interface, which occupies a remaining portion of the first initial memory interface and has less bandwidth than the first initial memory interface; and
   the second graphics processing unit independently communicates with the second video memory via a second reduced memory interface, which occupies a remaining portion of the initial memory interface and has less bandwidth than the second initial memory interface.

3. The graphics system of claim 2, wherein each of the first graphics processing unit and the second graphics unit further includes a local cache.

4. The graphics system of claim 1, wherein the first graphics processing unit accesses anti-aliasing information generated by the second graphics processing unit and stored in the second video memory via the private connection to complete an anti-aliasing operation.

5. The graphics system of claim 1, wherein the first graphics processing unit accesses texture information stored in the second video memory via the private connection to render a frame for display.

6. The graphics system of claim 5, wherein the first video memory stores a first portion of a texture rendering target that the first graphics processing unit renders into, and the second video memory independently stores a second portion of the texture rendering target that the second graphics processing unit renders into.

7. The graphics system of claim 1, wherein the first graphics processing unit and the second graphics processing unit are further coupled by a bridge device that supports symmetric communication links.

8. A method of creating a logical graphics processing unit and a logical video memory module, comprising:
   allocating a portion of a first initial memory interface supported by a first graphics processing unit and a first video memory that is directly coupled to the first graphics processing unit and a portion of a second initial memory interface supported by a second graphics processing unit and a second video memory that is directly coupled to the second graphics processing unit for a private connection directly connecting the first graphics processing unit to the second graphics processing unit; and
   enabling the first graphics processing unit to access resources of the second graphics processing unit via the private connection wherein the first graphics processing unit and the second graphics processing unit appear to a graphics application as a single graphics processing unit coupled to a video memory having a memory capacity equal to the sum of the first video memory capacity and the second video memory capacity.

9. The method of claim 8, further comprising
   allocating a remaining portion of the first initial memory interface for the first graphics processing unit to communicate with the first video memory, wherein the remaining portion of the first initial memory interface has less bandwidth than the first initial memory interface; and
   allocating a remaining portion of the second initial memory interface for the second graphics processing unit to communicate with the second video memory, wherein the remaining portion of the second initial memory interface has less bandwidth than the second initial memory interface.

10. The method of claim 9, further comprising caching traffic from the first video memory and the second video memory in the first graphics processing unit and the second graphics processing unit, respectively.

11. The method of claim 8, further comprising pulling anti-aliasing information generated by the second graphics processing unit and stored in the second video memory via the private connection to complete an anti-aliasing operation by the first graphics processing unit.

12. The method of claim 8, further comprising accessing texture information stored in the second video memory via the private connection to render a frame for display by the first graphics processing unit.

13. The method of claim 8, further comprising:
   storing a first portion of a texture rendering target rendered into by the first graphics processing unit in the first video memory; and
   independently storing a second portion of the texture rendering target rendered into by the second graphics processing unit in the second video memory.

14. The method of claim 8, further comprising coupling the first graphics processing unit and the second graphics processing unit to a bridge device via symmetric communication links.

15. A computing device that includes a multi-graphics processing unit graphics subsystem, comprising:
   a central processing unit;
   a system memory;
   first graphics processing unit supporting a first initial memory interface to communicate with a first video memory that is directly coupled to the first graphics processing unit; and
   a second graphics processing unit supporting a second initial memory interface to communicate with a second video memory that is directly coupled to the second graphics processing unit, wherein
   the first graphics processing unit is directly coupled to the second graphics processing unit via a private connection utilizing a portion of the first initial memory interface and a portion of the second initial memory interface to create a single logical graphics processing unit and a single logical video memory module that appear to a graphics application as a single graphics processing unit coupled to a video memory having a memory capacity equal to the sum of the first video memory capacity and the second video memory capacity.

16. The computing device of claim 15, wherein
the first graphics processing unit communicates with the first video memory via a first reduced memory interface, which occupies a remaining portion of the first initial memory interface and has less bandwidth than the first initial memory interface; and
the second graphics processing unit independently communicates with the second video memory via a second reduced memory interface, which occupies a remaining portion of the initial memory interface and has less bandwidth than the second initial memory interface.

17. The computing device of claim 16, wherein each of the first graphics processing unit and the second graphics unit further includes a local cache.

18. The computing device of claim 15, wherein the first graphics processing unit accesses anti-aliasing information generated by the second graphics processing unit and stored in the second video memory via the private connection to complete an anti-aliasing operation.

19. The computing device of claim 15, wherein the first graphics processing unit accesses texture information stored in the second video memory via the private connection to render a frame for display.

20. The computing device of claim 15, wherein the first video memory stores a first portion of a texture rendering target that the first graphics processing unit renders into, and the second video memory independently stores a second portion of the texture rendering target that the second graphics processing unit renders into.

21. The computing device of claim 15, wherein the first graphics processing unit and the second graphics processing unit are further coupled by a bridge device that supports symmetric communication links.

* * * * *